United States Patent
Ioffe et al.

(10) Patent No.: US 9,405,538 B2
(45) Date of Patent: Aug. 2, 2016

(54) FUNCTIONAL UNIT HAVING TREE STRUCTURE TO SUPPORT VECTOR SORTING ALGORITHM AND OTHER ALGORITHMS

(71) Applicant: Intel Corporation, Santa Clara, CA (US)

(72) Inventors: Robert M. Ioffe, Portland, OR (US); Nicholas C. Galoppo Von Borries, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 723 days.

(21) Appl. No.: 13/730,685

(22) Filed: Dec. 28, 2012

(65) Prior Publication Data
US 2014/0189292 A1    Jul. 3, 2014

(51) Int. Cl.
  *G06F 9/44*    (2006.01)
  *G06F 7/38*    (2006.01)
  *G06F 9/30*    (2006.01)
  *G06F 9/38*    (2006.01)
  *G06F 7/24*    (2006.01)

(52) U.S. Cl.
  CPC .......... *G06F 9/30036* (2013.01); *G06F 9/3001* (2013.01); *G06F 9/30021* (2013.01); *G06F 9/3893* (2013.01); *G06F 7/24* (2013.01)

(58) Field of Classification Search
  CPC ................ G06K 19/06037; H04L 67/2885
  See application file for complete search history.

(56) References Cited

U.S. PATENT DOCUMENTS

| 4,734,877 A | * | 3/1988 | Sakata ................ G06F 15/8053 708/441 |
| 5,287,494 A | | 2/1994 | Garcia et al. |
| 5,937,188 A | * | 8/1999 | Freeman ................ G06F 8/443 717/104 |
| 2007/0046511 A1 | * | 3/2007 | Morzano .................. G11C 7/10 341/101 |
| 2009/0177657 A1 | * | 7/2009 | Carroll ...................... G06F 7/24 |
| 2011/0153989 A1 | | 6/2011 | Rajwar et al. |

FOREIGN PATENT DOCUMENTS

WO    2012080484 A1    6/2012

OTHER PUBLICATIONS

PCT/US2013/046801 Written Opinion of the International Searching Authority, mailed Jun. 30, 2015, 5 pages.
PCT/US2013/046801 International Search Report, mailed Jun. 30, 2015, 3 pages.
PCT/US2013/046801 International Preliminary Report on Patentability, mailed Jul. 7, 2015, 6 pages.

* cited by examiner

*Primary Examiner* — Hyun Nam
(74) *Attorney, Agent, or Firm* — Nicholson De Vos Webster & Elliott, LLP

(57) ABSTRACT

An apparatus is described having a functional unit of an instruction execution pipeline. The functional unit has a plurality of compare-and-exchange circuits coupled to network circuitry to implement a vector sorting tree for a vector sorting instruction. Each of the compare-and-exchange circuits has a respective comparison circuit that compares a pair of inputs. Each of the compare-and-exchange circuits have a same sided first output for presenting a higher of the two inputs and a same sided second output for presenting a lower of the two inputs, said comparison circuit to also support said functional unit's execution of a prefix min and/or prefix add instruction.

21 Claims, 10 Drawing Sheets

FUNCTIONAL UNIT HAVING TREE STRUCTURE TO SUPPORT VECTOR SORTING ALGORITHM AND OTHER ALGORITHMS

FIELD OF INVENTION

The field of invention relates to generally to the computing sciences and more specifically to a functional unit capable of performing a plurality of different instructions with a sorting network.

BACKGROUND

Vector Instruction Execution Pipeline

FIG. 1 shows a high level diagram of a processing core 100 implemented with logic circuitry on a semiconductor chip. The processing core includes a pipeline 101. The pipeline consists of multiple stages each designed to perform a specific step in the multi-step process needed to fully execute a program code instruction. These typically include at least: 1) instruction fetch and decode; 2) data fetch; 3) execution; 4) write-back. The execution stage performs a specific operation identified by an instruction that was fetched and decoded in prior stage(s) (e.g., in step 1) above) upon data identified by the same instruction and fetched in another prior stage (e.g., step 2) above). The data that is operated upon is typically fetched from (general purpose) register storage space 102. New data that is created at the completion of the operation is also typically "written back" to register storage space (e.g., at stage 4) above).

The logic circuitry associated with the execution stage is typically composed of multiple "execution units" or "functional units" 103_1 to 103_N that are each designed to perform its own unique subset of operations (e.g., a first functional unit performs integer math operations, a second functional unit performs floating point instructions, a third functional unit performs load/store operations from/to cache/memory, etc.). The collection of all operations performed by all the functional units corresponds to the "instruction set" supported by the processing core 100.

Two types of processor architectures are widely recognized in the field of computer science: "scalar" and "vector". A scalar processor is designed to execute instructions that perform operations on a single set of data, whereas, a vector processor is designed to execute instructions that perform operations on multiple sets of data. FIGS. 2A and 2B present a comparative example that demonstrates the basic difference between a scalar processor and a vector processor.

FIG. 2A shows an example of a scalar AND instruction in which a single operand set, A and B, are ANDed together to produce a singular (or "scalar") result C (i.e., A.AND.B=C). By contrast, FIG. 2B shows an example of a vector AND instruction in which two operand sets, A/B and D/E, are respectively ANDed to produce a vector result C, F (i.e., A.AND.B=C and D.AND.E=F). As a matter of terminology, a "vector" is a data element having multiple "elements". For example, a vector V=Q, R, S, T, U has five different elements: Q, R, S, T and U. The "size" of the exemplary vector V is five (because it has five elements).

FIG. 1 also shows the presence of vector register space 107 that is different than general purpose register space 102. Specifically, general purpose register space 102 is nominally used to store scalar values. As such, when, any of execution units perform scalar operations they nominally use operands called from (and write results back to) general purpose register storage space 102. By contrast, when any of the execution units perform vector operations they nominally use operands called from (and write results back to) vector register space 107. Different regions of memory may likewise be allocated for the storage of scalar values and vector values.

Note also the presence of masking logic 104_1 to 104_N and 105_1 to 105_N at the respective inputs to and outputs from the functional units 103_1 to 103_N. In various implementations, for vector operations, only one of these layers is actually implemented—although that is not a strict requirement (although not depicted in FIG. 1, conceivably, execution units that only perform scalar and not vector operations need not have any masking layer). For any vector instruction that employs masking, input masking logic 104_1 to 104_N and/or output masking logic 105_1 to 105_N may be used to control which elements are effectively operated on for the vector instruction. Here, a mask vector is read from a mask register space 106 (e.g., along with input operand vectors read from vector register storage space 107) and is presented to at least one of the masking logic 104, 105 layers.

Over the course of executing vector program code each vector instruction need not require a full data word. For example, the input vectors for some instructions may only be 8 elements, the input vectors for other instructions may be 16 elements, the input vectors for other instructions may be 32 elements, etc. Masking layers 104/105 are therefore used to identify a set of elements of a full vector data word that apply for a particular instruction so as to affect different vector sizes across instructions. Typically, for each vector instruction, a specific mask pattern kept in mask register space 106 is called out by the instruction, fetched from mask register space and provided to either or both of the mask layers 104/105 to "enable" the correct set of elements for the particular vector operation.

FIGURES

The present invention is illustrated by way of example and not limitation in the figures of the accompanying drawings, in which like references indicate similar elements and in which:

FIG. 1 (prior art) shows an embodiment of an instruction execution pipeline;

FIG. 2A-B (prior art) shows an example of vector processing;

FIG. 3 (prior art) pertains to a prior art sorting algorithm;

DETAILED DESCRIPTION

Prior Art Sort Algorithm

Figure 3:
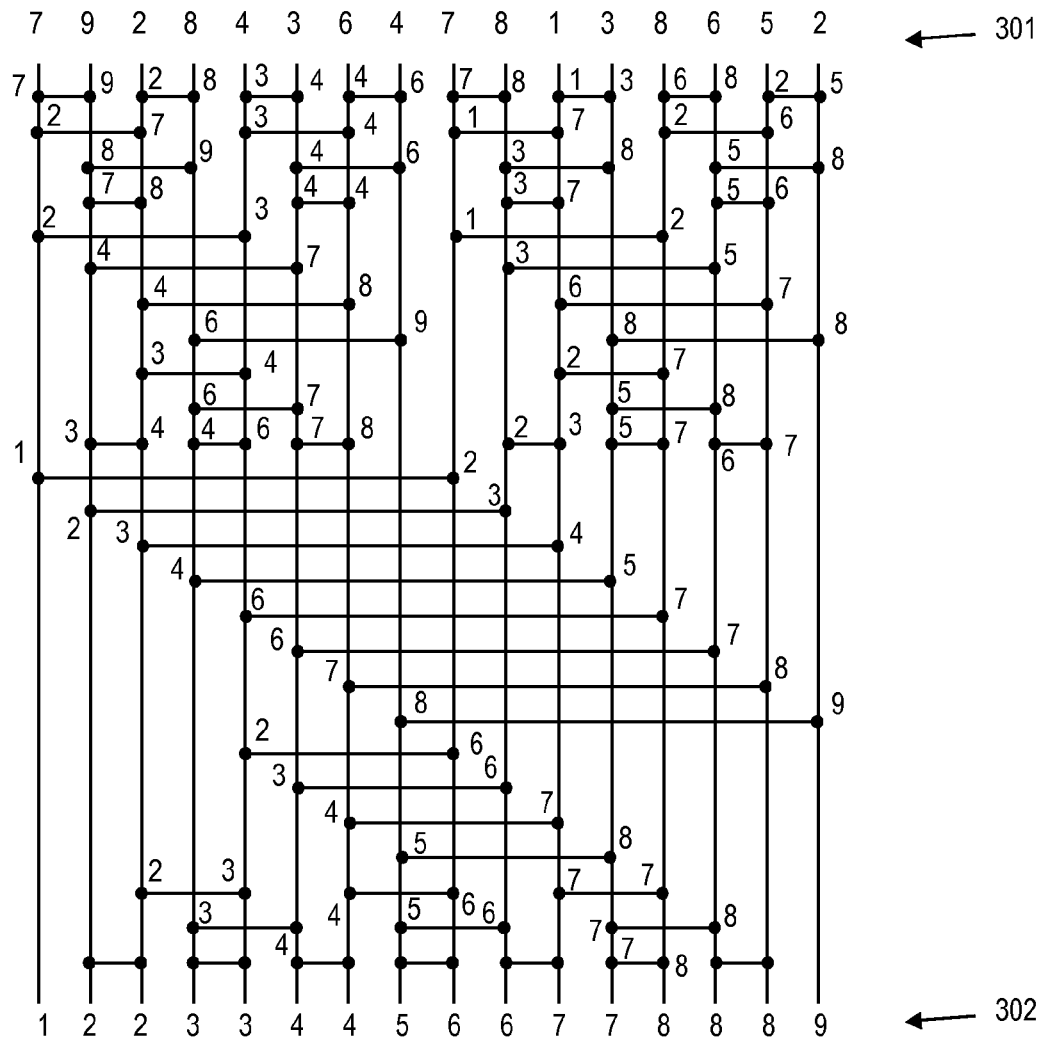

FIG. 3 shows a prior art software process that sorts a set of unordered data into an ordered set. Referring to FIG. 3, unordered input set 301 is ordered by way of the sorting process depicted in FIG. 3 to form output sorted set 302. A sorted set is a set of values that have been ranked according to some criteria. The most basic criteria, which is depicted in the process of FIG. 3, is a numerical ranking. That is, elements in a set are sorted based on their numerical values relative to one another. As observed in FIG. 3, the elements of output sorted set 302 are ranked in numerical order with smaller values aligned to the left and higher values aligned to the right.

The output sorted set 302 is produced from the input unsorted set 301 according to the sequence of procedures outlined n FIG. 3. Here, each horizontal bar represents a "compare and exchange" operation in which the two connected values are compared, and, the lesser of the two compared elements is routed to the leftmost downstream path stemming from the horizontal connection while the higher of the two compared elements is routed to the rightmost downstream path from the horizontal connection.

To date the above described sorting algorithm has been implemented in software such that each newly calculated element in any intermediate set or the resultant set consumes multiple CPU instructions. As such, computing the entire algorithm can consume hundreds if not thousands of CPU instructions.

Functional Unit Capable of Executing Sorting Algorithm and Other Algorithms

Figure 4:
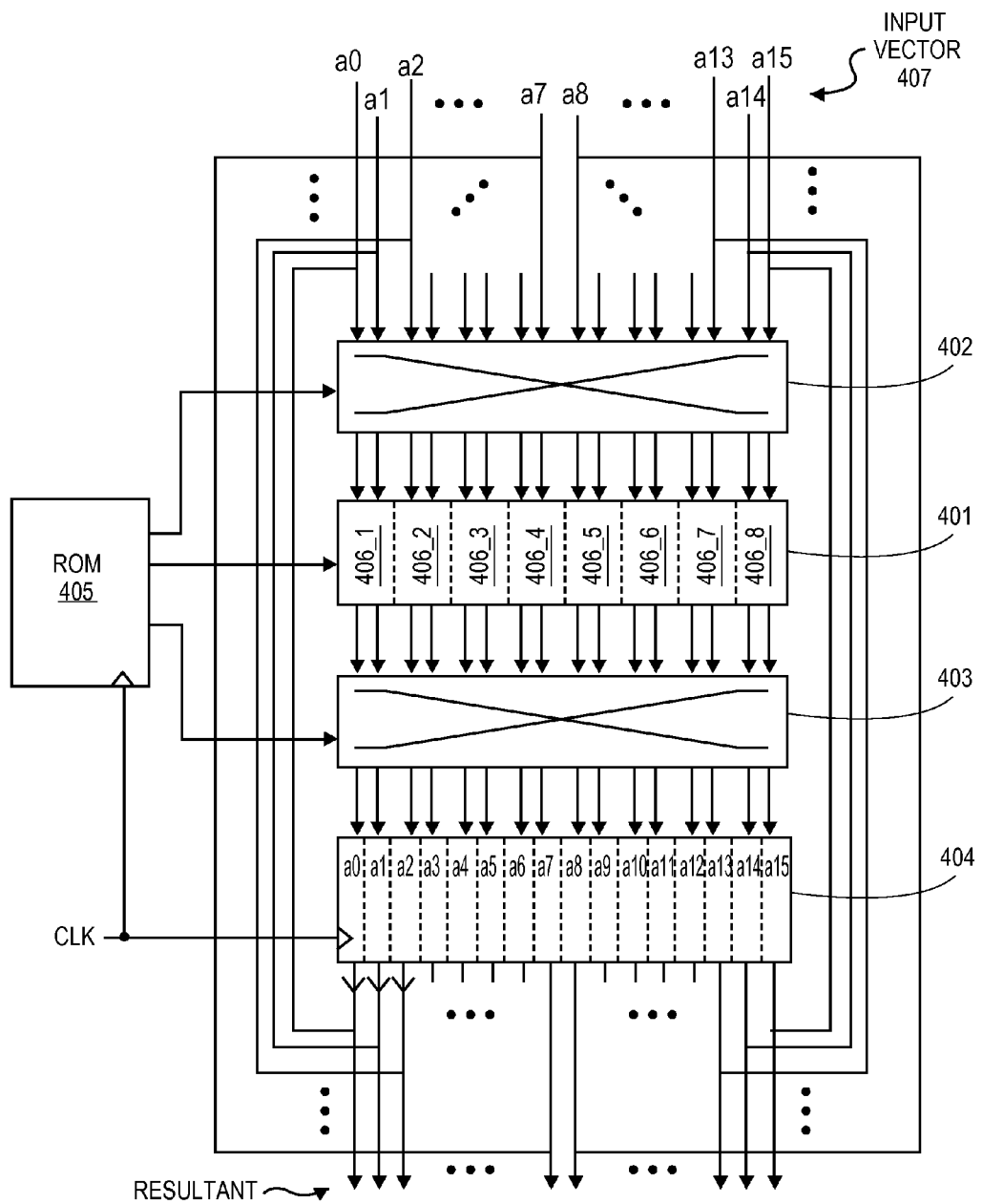
FIG. 4 shows an embodiment of instruction execution logic circuitry for implementing the sorting algorithm of FIG. 3 in a single instruction.

In order to greatly speed up the construction of a sorted set from an unsorted set, FIG. 4 shows an embodiment of a logic circuit design for a functional unit 400 within an instruction execution pipeline that implements a sorting algorithm with a single instruction. The functional unit is also capable of executing additional instructions as will be described in more detail below.

As observed in FIG. 4 the functional unit includes a bank of compare-and-exchange circuits 401 between a pair of switching networks referred to herein as the first (preceding) switching network 402 and the second (following) switching network 403. The starting input vector is presented at the a0 through a15 inputs of the functional unit 407. Those of ordinary skill will recognize that the functionality of the functional unit described herein can successfully be implemented with a single switching network that either precedes or follows the compare-and-exchange circuit bank 401. However, for ease of visualizing the rather complex switching tasks of the functional unit 400 an embodiment having two switching networks will be referred to hereafter.

A register bank 404 is coupled downstream from the second switching network 403. A read-only-memory (ROM) circuit 405 contains micro-code that generates control signals to the first and second switching networks 402, 403 so that values on channel lines a0 through a15 are routed to an appropriate compare-and-exchange circuit within the compare-and-exchange circuit bank 401. The register bank 404 feeds the first switching network 402 in a loopback fashion.

Figure 5:
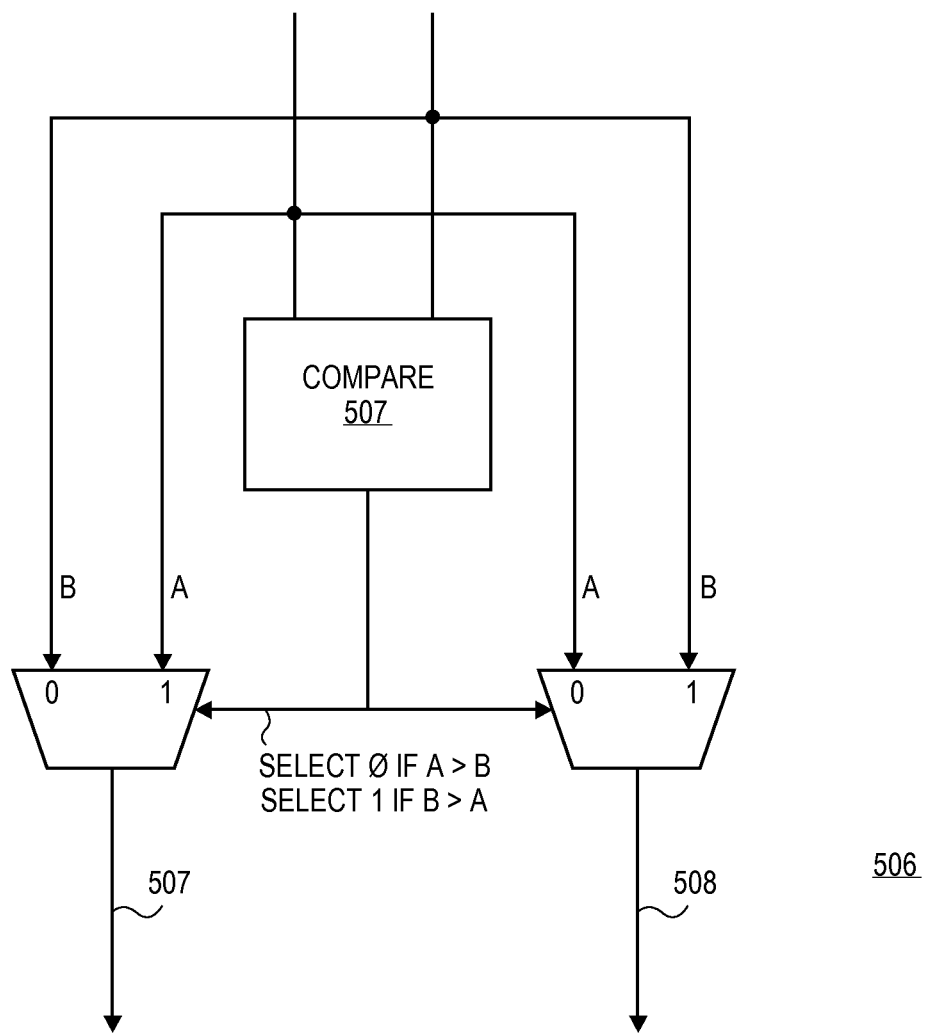
FIG. 5 shows a comparison compare-and-exchange circuit.

In the particular embodiment of FIG. 4 there are eight exchange and compare circuits 406_1 through 406_8 within the compare-and-exchange circuit bank 401. FIG. 5 shows an embodiment of the design 506 of each compare-and-exchange circuit. As observed in FIG. 5, a single compare-and-exchange circuit 506 has two inputs and two outputs. A comparison circuit 507 compares the two inputs and determines which input is greater. An output route is then selected for the two inputs based on which of the inputs is greater. In the particular embodiment of FIG. 5, the greater input value is presented at the rightmost output 508 and the lesser input value is presented at the leftmost output 507.

Figure 6:
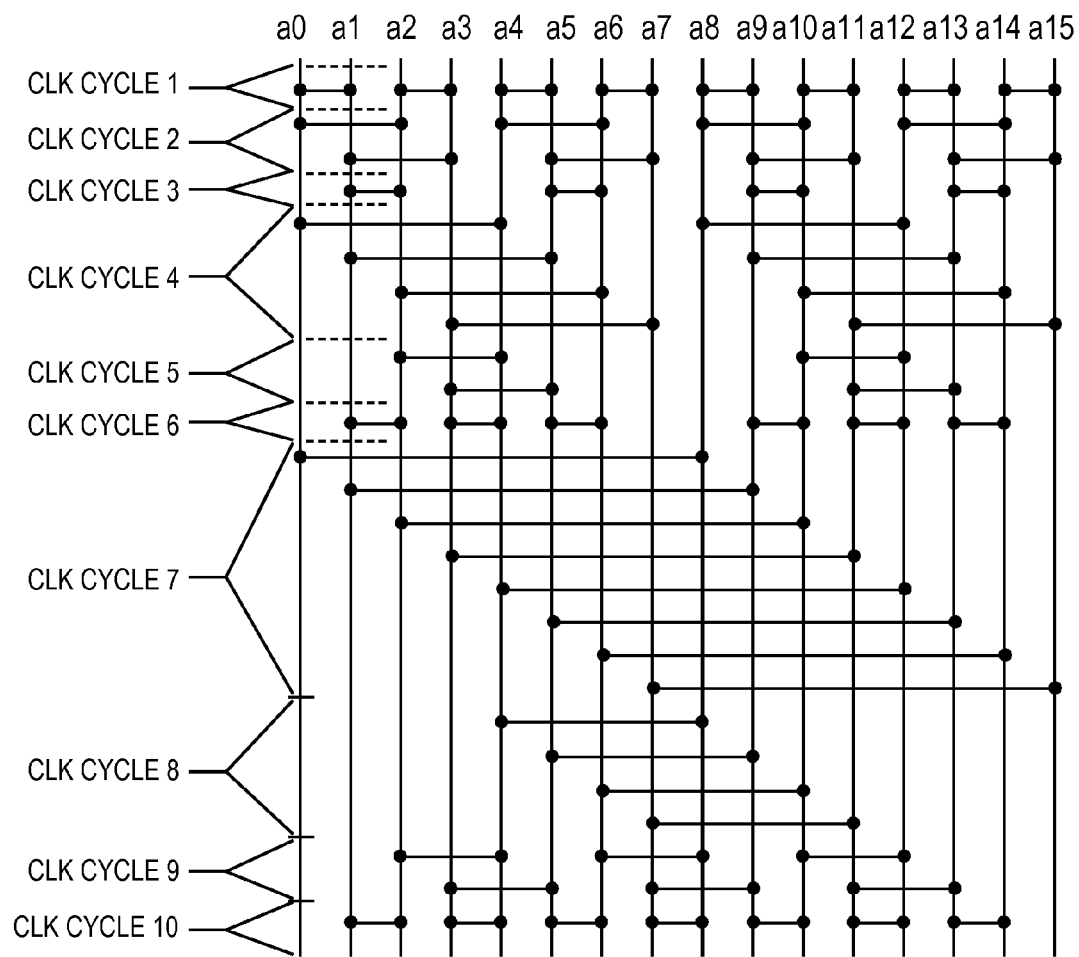
FIG. 6 shows the sorting tree of FIG. 3 as implemented by the circuitry of FIG. 4.

The functional unit then implements the sorting tree of FIG. 3 according to the timing diagram of FIG. 6. FIG. 6 essentially shows the sorting tree of FIG. 3 with the stages of the sorting tree dispersed amongst multiple clock cycles of the functional unit. Moreover, FIG. 6 describes the state of the first and second switching networks 402, 403 for each clock cycle. For instance, in the second clock cycle, a first compare-and-exchange circuit receives input from (first network) and generates outputs for (second network) the a0 and a2 channels, a second compare-and-exchange circuit receives input from and generates output for the a1 and a3 channels, etc. Note that the maximum number of utilized compare-and-swap circuits for any stage is eight (clock cycles 1, 4, 7, 9, and 10). Hence, there are eight compare-and-exchange circuits 406_1 through 406_8 within the compare-and-exchange bank 401.

With each new clock cycle, the values within the register bank 404 are directed to the first switching network 402, which routes sets of values to be compared-and-exchanged to a particular one of the compare-and-exchange circuits within the compare-and-exchange bank 401. Each compare-and-exchange circuit performs its corresponding compare-and-exchange function on its respective pair of values. The pair of values are then routed to the appropriate channel of the register bank 404 by the second switching network 403.

After suitable propagation delay has elapsed through the first switching network 402, the compare-and-exchange bank 401 and the second switching network 403, the newly generated values are latched into the register bank 404. The process then repeats for the next clock cycle with the state of the first and second networks (i.e., the pattern of established routes within the networks) typically being changed from the old to the new clock cycle. Here, microcode from the ROM circuit 405 controls overall flow including the presentation of new control signals to the first and second switching networks 402, 403 for each new clock cycle.

As observed in FIG. 3, a sixteen element vector can be completely processed in ten clock cycles. Moreover, the particular sorting pattern of FIG. 3 is also suitable for vector sizes of 2, 4, 6 and 8. Thus the particular instruction of FIG. 6 is capable of processing vectors of size 2, 4, 6, 8 or 16 (those of ordinary skill will recognize that even larger vector sizes are possible, e.g., 32, 64, etc.). Here, for example, a vector of size 16 will present a value for each of channels a0 through a15, a vector of size 8 will present a value for each of channels a0 through a7, etc. Notably, the number of needed clock cycles grows with the size of the input vector. As mentioned above, ten clock cycles are consumed sorting a vector having sixteen elements. By contrast, only the first six clock cycles are needed to sort a vector having eight elements, only the first three clock cycles are needed to sort a vector having four elements and only the first clock cycle is needed to sort a vector having two elements.

To the extent vector sizes less than 16 are entertained, due to the symmetry of the tree, the functional unit can process multiple vectors in parallel. That is, the functional unit can sort a pair of eight element vectors in parallel over the first six clock cycles (a first input vector consumes channels a0 through a7 and a second input vector consumes channels a8 through a15). Similarly, the functional unit can simultaneously sort four input vectors of size four over the first three clock cycles (with the input vectors arranged to occupy channels a0-a3; a4-7; a8-a11; a12-a15), or, sort eight input vectors of size two over the first clock cycle (with the input vectors arranged to occupy channels a0-a1; a2-a3; a4-a5; a6-a7; a8-a9; a10-a11; a12-a13; a14-a15).

Thus there is tremendous "re-use" of the network control signals within the ROM 405 across multiple sorting instructions supported by the functional unit. Said another way, the functional unit can perform the various sorting functions described above with only a single set of switching network control signals stored in the ROM 405 (one for each clock cycle), and, information that indicates how many clock cycles are needed for the instruction (e.g., as a function of the size of the input vector(s)). In an embodiment the instruction format includes an opcode or immediate operand that specifies the size of the input vector(s). Based on the size of the input vector(s) the microcode in the ROM 405 is able to determine how many clock cycles are needed to execute the instruction.

Apart from sorting functions, additional tree settings can be stored in the ROM 405 to implement other functions (besides sorting functions) coupled with some additional functionality added to the compare-and-exchange circuit of FIG. 5.

Figure 7:
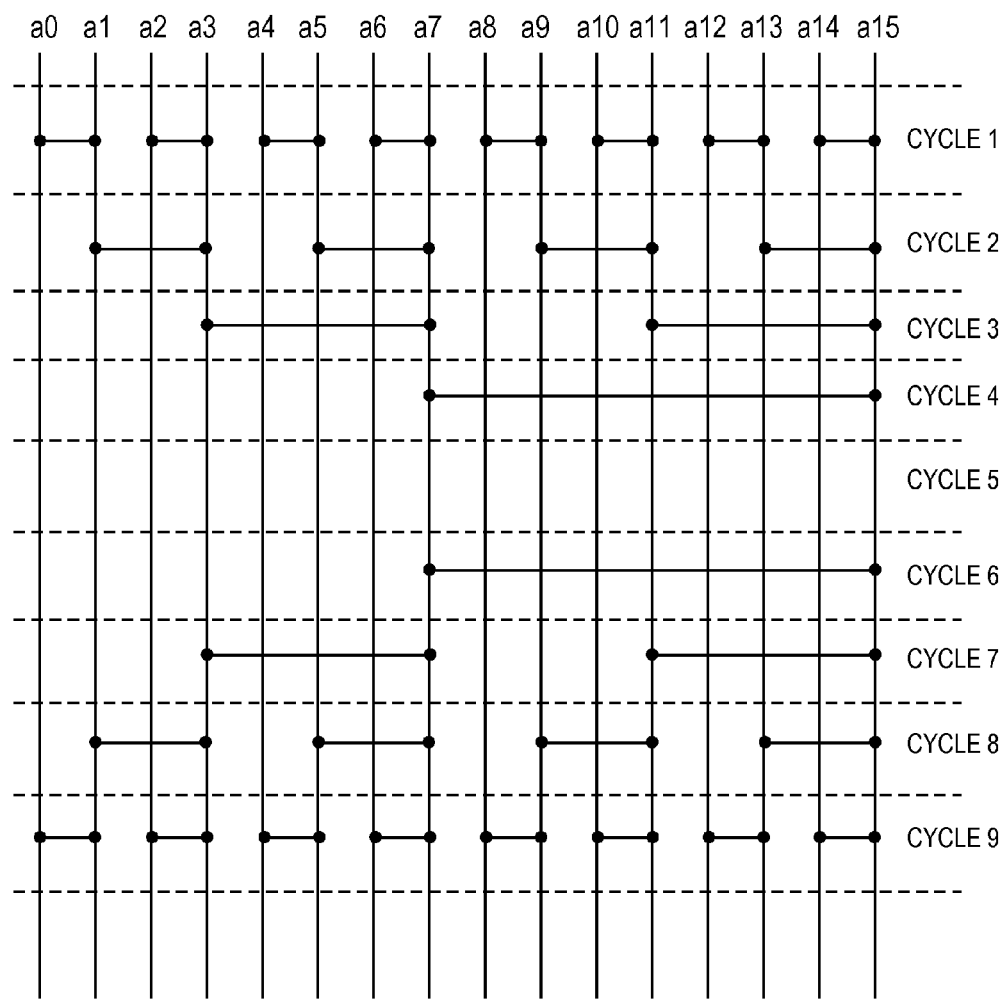
FIG. 7 shows another tree to implement a prefix add and/or prefix multiply instruction with the circuitry of FIG. 4.

FIG. 7 shows tree settings to implement either or both of a prefix add or prefix multiply operation. Prefix add and prefix multiply operations are known in the art. A prefix add operation will add values horizontally across an input vector and present as the result the intermediate value at each element location that corresponds to the summation leading up to the element location. For example, for an input vector 1 2 3 4, the prefix add function will be 0 1 3 6 10. The specific sorting tree pattern observed in FIG. 7 is known in the art. However, its implementation along with micro-code tree settings also used to implement a sorting function is believed to be new.

Each horizontal line in the first four clock cycles of FIG. 7 corresponds to a rightwise addition function that receives two input values and presents the summation of the two input values on its rightmost input. During the fifth clock cycle the rightmost channel a15 is cleared to a value of 0. Each horizontal line in clock cycles six, seven, eight and nine correspond to a sum-and-exchange function that accepts two input values and provides the summation of the two input values at the rightmost output and provides the rightmost input at the leftmost output.

Figure 8:
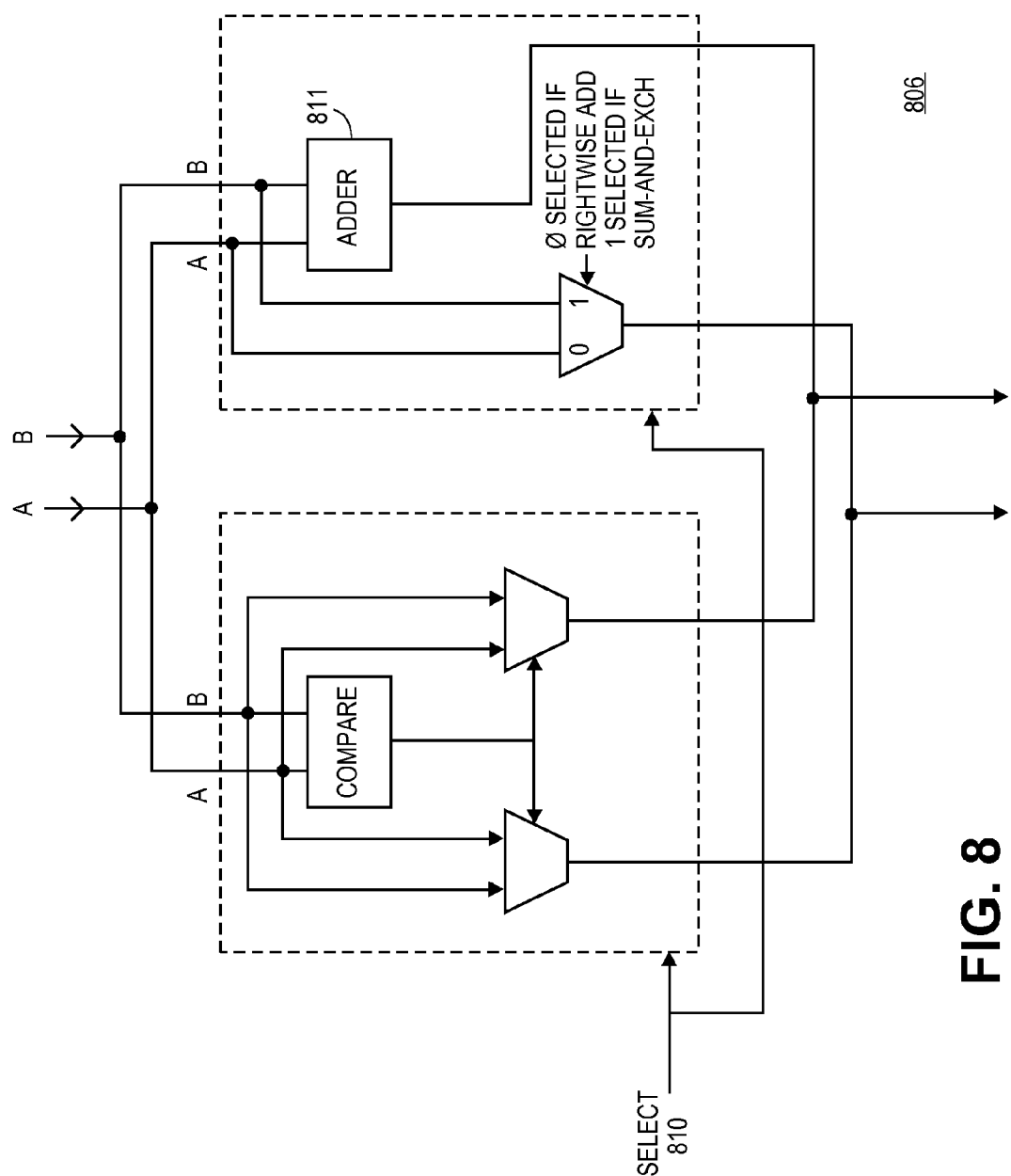
FIG. 8 shows the compare-and-exchange circuit of FIG. 5 enhanced to include functionality to implement an addition function and a sum-and-exchange function.

FIG. 8 shows the compare-and-exchange circuit of FIG. 5 enhanced to include both the rightwise addition function and the sum-and-exchange functions. Here, a select input 810 to the circuit 806 determines which function is to be implemented (compare-and-exchange; rightwise addition; sum-and-exchange). As observed in FIG. 8, the enhanced circuit 806 includes an adder 811 to implement the rightwise addition and sum-and-exchange functions. The select input 810 is provided by the micro-code and will select the rightwise addition function for the first through fourth clock cycles of FIG. 7 and the sum-and-exchange function for the sixth through eighth clock cycles.

Figure 9:
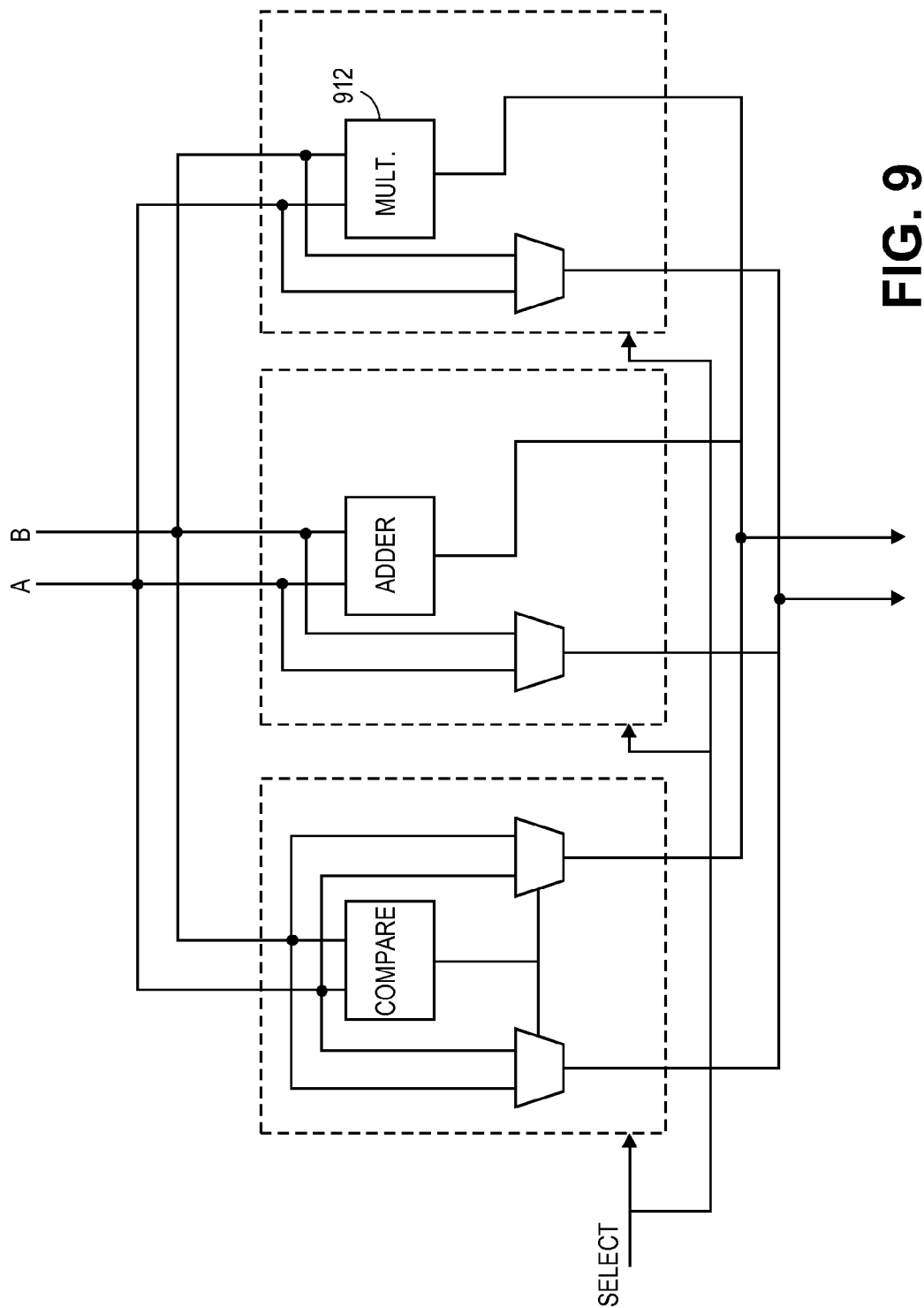
FIG. 9 shows the compare-and-exchange circuit of FIG. 8 enhanced to include functionality to implement a multiplication function and a multiply-and-exchange function.

FIG. 9 shows the circuit of FIG. 8 enhanced so that prefix multiply functions can be supported. Here, the same tree as in FIG. 7 is implemented but the functions performed at each stage correspond to multiplication instead of addition. The circuit of FIG. 9 therefore supports two additional functions: rightwise multiplication where the product of the two input values is placed at the rightmost output, and, multiply-and-exchange where the product of the two inputs is provided at the rightmost output and the rightmost input is provided at the leftmost output.

As such, for these functions, multiplier 912 is used instead of adder 911. The circuit supports two more input values at select input 910 to select these functions.

In an even further implementation the sorting tree of FIG. 6 can also be used to implement prefix min and prefix max operations. A prefix min operation presents the minimum value observed for an input vector for each element when the input vector is scanned from a particular direction. For example, for an input vector 5 4 7 9 8 2 7 the output vector will be 5 4 4 4 4 2 2 when scanned from left to right. A prefix max function provides the maximum observed rather than the minimum observed value. For example, scanning left to right, the prefix max function will provide the following resultant for the same input vector 5 5 7 9 9 9 9.

To implement these functions the same tree as presented in FIG. 7 can be used with (again) modification to the circuitry that performs the logical analysis. Here, the circuit of FIG. 9 can be enhanced to include additional comparison functionality that compares two inputs and presents the minimum on the rightmost output (prefix min) or maximum on the rightmost output (prefix max). These comparison functions are selected for clock cycles one through four. The aforementioned compare-and-exchange function can be used for clock cycles six through eight.

In additional embodiments, the instruction format for the functional unit specifies an opcode or immediate operand that indicates which of any/all the different operations described above (sorting, prefix add, prefix multiply, prefix min, prefix max) is to be executed. In response, the microcode in the ROM provides the correct sequence of switching network settings and circuit selections to effect the indicated operation.

It is pertinent to note that the above described functional unit design envisioned a single bank of compare-and-exchange circuits (potentially enhanced to support other functions such as any/all of the prefix functions described above) that is "looped through" over a series of clocks settings with appropriate switching network settings. This particular design approach perhaps saves on semiconductor surface area as, in the case of the tree of FIG. 6, only eight compare-and-exchange circuits are needed even though 63 compare and exchange functions are executed (i.e., there are 63 horizontal lines in FIG. 6).

Although saving on semiconductor surface area, this same approach may consume more clock cycles than the approach on the opposite extreme. That is, an alternative embodiment might build the entire tree of FIG. 6 in hardware. In this case, there will be 63 separate compare-and-exchange circuits connected to the a0-a15 channels in the tree according to the connections observed in FIG. 6. These various switching connections may also be viewed as a network (albeit a hard-wired rather than configured/configurable one). This approach may conceivably consume fewer clock cycles as the propagation delay of the entire functional unit for the sorting function becomes comparable to the propagation delay through ten compare-and-exchange circuits (one propagation delay for each stage through the tree). In this case, the ROM need not contain network switch settings. If the functional unit is enhanced to include the prefix operations, those connections observed in the tree of FIG. 6 that can be used to support the prefix tree of FIG. 7 will be "enabled" as will special additional connections that cannot simply be re-used from the tree of FIG. 6.

Other design approaches may land somewhere between these two extremes (totally configurable network circuitry v. totally hardwired network circuitry) to strike a balance between silicon surface area consumption and speed.

Those of ordinary skill will be able to extend the tree patterns provided above to build alternative embodiments that accept vector sizes of greater than or less than 16. Said another way, those of ordinary skill will be able to take the teachings above to construct other tree embodiments having more than or less than sixteen channels.

Figure 1:
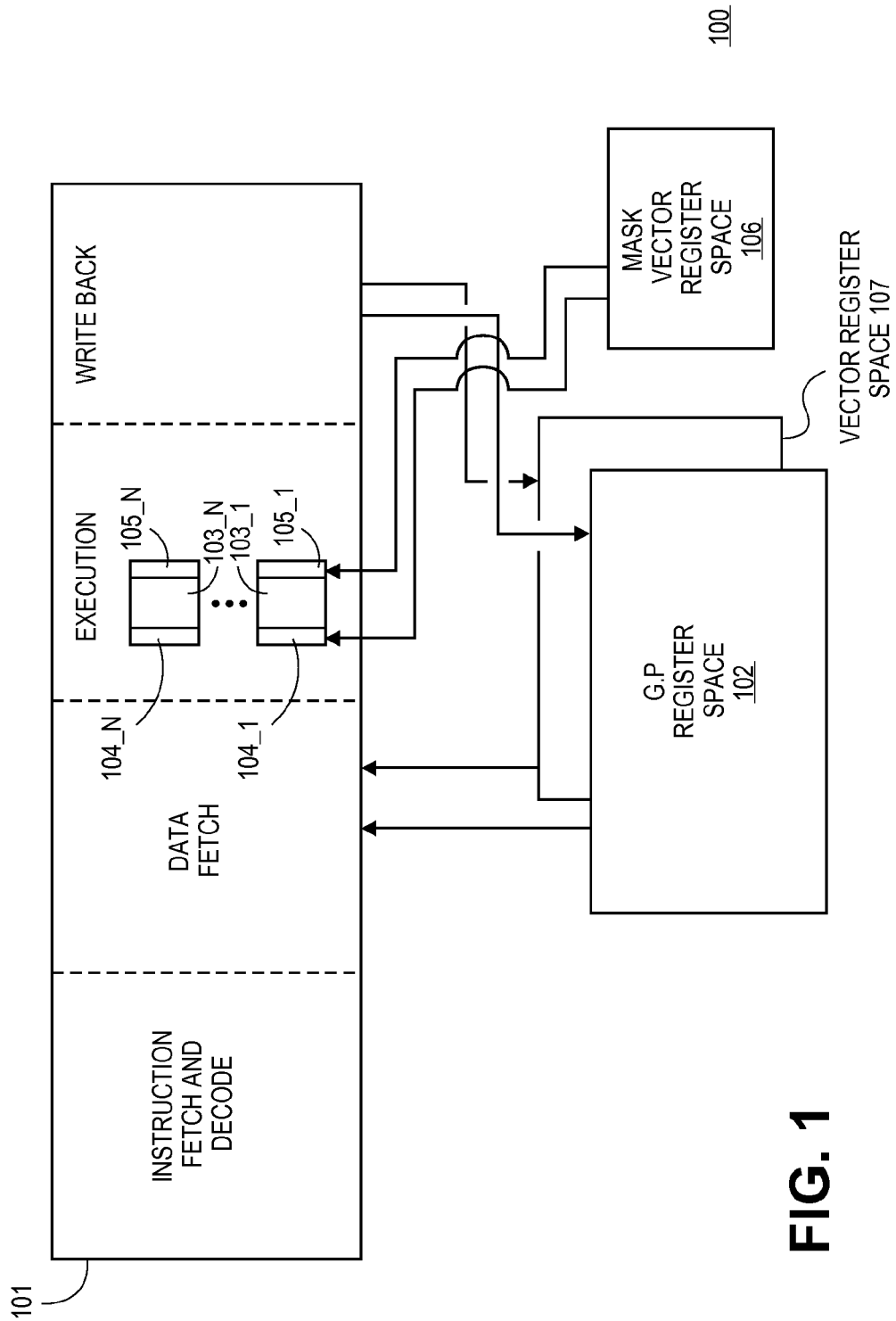
Figure 2A:
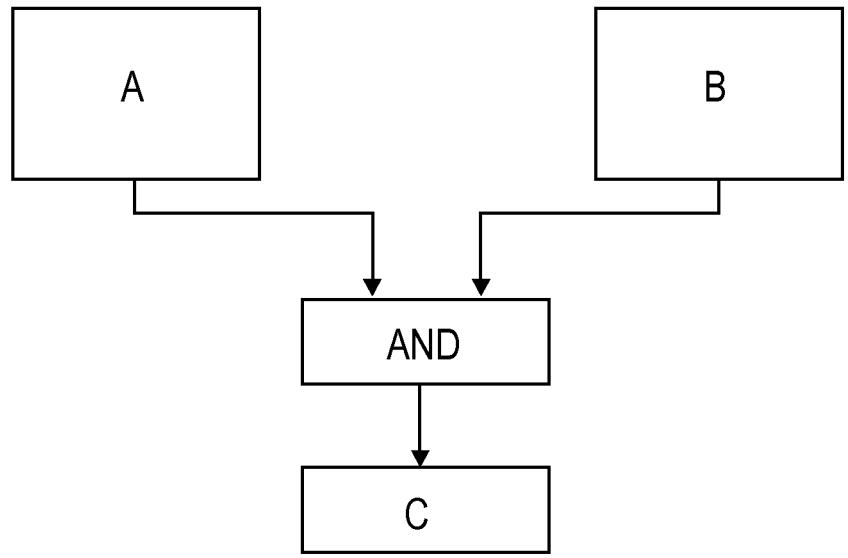
Figure 2B:
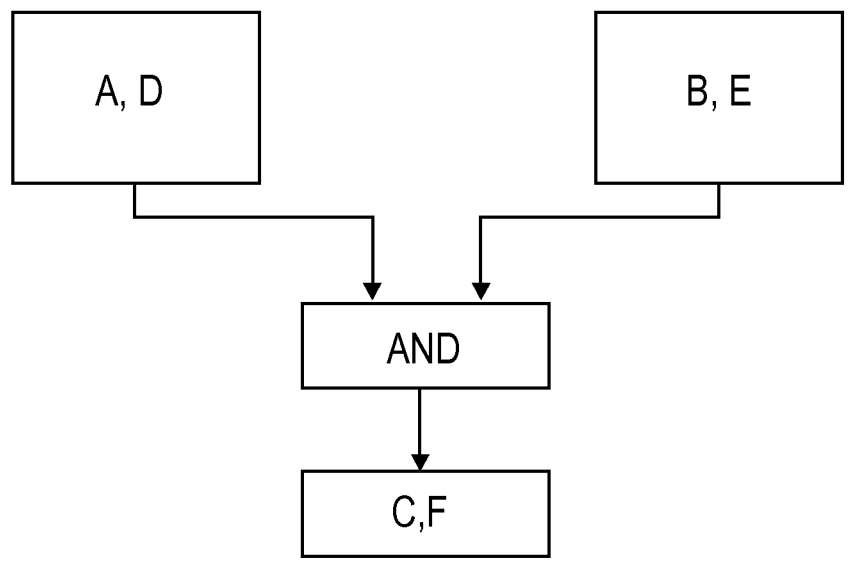
Figure 10:
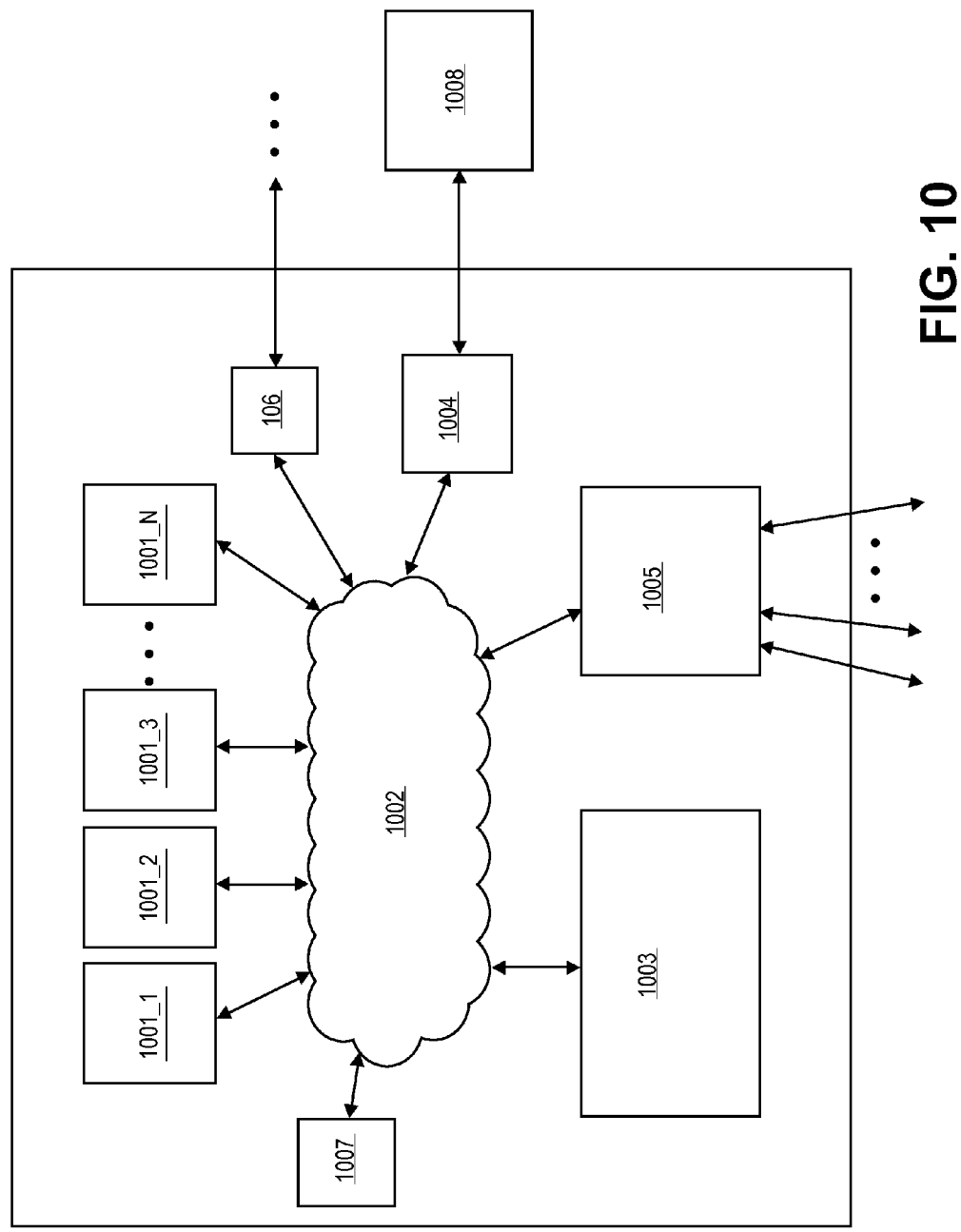
FIG. 10 shows an embodiment of a processor.

FIG. 10 shows the architecture of an exemplary multi-core processor 1000. As observed in FIG. 1000, the processor includes: 1) multiple processing cores 1001_1 to 1001_N; 2) an interconnection network 1002; 3) a last level caching system 1003; 4) a memory controller 1004 and an I/O hub 1005. Each of the processing cores contain one or more instruction execution pipelines for executing program code instructions. Any or all of such instruction execution pipelines may support the execution of vector instructions consistent with the description of FIG. 1, and, include a functional unit that can perform the operations discussed above with respect to FIGS. 4 through 9 above. The interconnect network 1002 serves to interconnect each of the cores 1001_1 to 1001_N to each other as well as the other components 1003, 1004, 1005. The last level caching system 1003 serves as a last layer of cache in the processor before instructions and/or data are evicted to system memory 1008.

The memory controller 1004 reads/writes data and instructions from/to system memory 1008. The I/O hub 1005 manages communication between the processor and "I/O" devices (e.g., non volatile storage devices and/or network interfaces). Port 1006 stems from the interconnection network 1002 to link multiple processors so that systems having more than N cores can be realized. Graphics processor 1007 performs graphics computations. Power management circuitry (not shown) manages the performance and power states of the processor as a whole ("package level") as well as aspects of the performance and power states of the individual units within the processor such as the individual cores 1001_1 to 1001_N, graphics processor 1007, etc. Other functional blocks of significance (e.g., phase locked loop (PLL) circuitry) are not depicted in FIG. 10 for convenience.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
    a functional unit of an instruction execution pipeline comprising a plurality of compare-and-exchange circuits in parallel and coupled to network circuitry to execute a single vector sorting instruction to sort an input operand of one or more vectors into numerical order, each of said compare-and-exchange circuits having a respective comparison circuit that compares a pair of inputs, each of said compare-and-exchange circuits having a first output for presenting a higher of the pair of inputs and a second output for presenting a lower of the pair of inputs; and
    a memory circuit containing microcode that provides control signals to said network circuitry to loopback each output of the plurality of compare-and-exchange circuits into the plurality of compare-and-exchange circuits until each vector of an input operand of a plurality of vectors is sorted.

2. The apparatus of claim 1 wherein each vector of the input operand of the plurality of vectors is a same size.

3. The apparatus of claim 2 wherein said same size is specified with an immediate operand of said single vector sorting instruction.

4. The apparatus of claim 2 wherein said same size is any one of 2 elements, 4 elements, 8 elements, and 16 elements.

5. The apparatus of claim 1 wherein said functional unit simultaneously sorts each vector of the input operand of the plurality of vectors.

6. The apparatus of claim 1 wherein said network circuitry includes a configurable switching network.

7. The apparatus of claim 1 wherein the control signals comprise a number of cycles to complete the sort of the input operand.

8. An apparatus comprising:
    a functional unit of an instruction execution pipeline comprising a plurality of compare-and-exchange circuits in parallel and coupled to network circuitry to execute a single vector sorting instruction to sort an input operand of multiple vectors into numerical order, each of said compare-and-exchange circuits having a respective comparison circuit that compares a pair of inputs, each of said compare-and-exchange circuits having a first output for presenting a higher of the pair of inputs and a second output for presenting a lower of the pair of inputs; and
    a memory circuit containing microcode that provides control signals to said network circuitry to loopback each output of the plurality of compare-and-exchange circuits into the plurality of compare-and-exchange circuits until each vector of the input operand of multiple vectors is sorted.

9. The apparatus of claim 8 wherein each vector of the input operand of multiple vectors is a same size.

10. The apparatus of claim 9 wherein said same size is specified with an immediate operand of said single vector sorting instruction.

11. The apparatus of claim 9 wherein said same size is any one of 2 elements, 4 elements, 8 elements, and 16 elements.

12. The apparatus of claim 8 wherein said functional unit simultaneously sorts each vector of the input operand of multiple vectors.

13. The apparatus of claim 8 wherein said network circuitry includes a configurable switching network.

14. The apparatus of claim 8 wherein the control signals comprise a number of cycles to complete the sort of the input operand.

15. The apparatus of claim 8 further comprising at least one of:
    an adder to implement a prefix add instruction with said functional unit, and a multiplier to implement a prefix multiply instruction with said functional unit.

16. A method comprising:
    performing the following with functional unit of an instruction execution pipeline to execute a single vector sorting instruction to sort an input operand of one or more vectors into numerical order:
    passing elements of the input operand of one or more vectors to a plurality of compare-and-exchange circuits in parallel and coupled to network circuitry, wherein each of said plurality of compare-and-exchange circuits perform the following:
        compare a pair of said elements,
        present a higher of the pair of the elements on a first output, and
        present a lower of the pair of the elements on a second output; and
    providing control signals to said network circuitry to loopback each output of the plurality of compare-and-exchange circuits into the plurality of compare-and-exchange circuits until each vector of an input operand of a plurality of vectors is sorted.

17. The method of claim 16 wherein each vector of the input operand of the plurality of vectors is a same size.

18. The method of claim 16 further comprising executing at least one of a prefix sum instruction and a prefix add instruction with said functional unit.

19. The method of claim 16 further comprising executing at least one of a prefix min instruction and a prefix max instruction with said functional unit.

20. The method of claim 16 wherein said functional unit simultaneously sorts each vector of the input operand of the plurality of vectors.

21. The method of claim 16 wherein the control signals comprise a number of cycles to complete the sort of the input operand.

* * * * *